(12) United States Patent
Tsuchiya

(10) Patent No.: US 12,275,429 B2
(45) Date of Patent: Apr. 15, 2025

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventor: Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 18/100,579

(22) Filed: Jan. 24, 2023

(65) Prior Publication Data
US 2023/0242145 A1  Aug. 3, 2023

(30) Foreign Application Priority Data

Jan. 31, 2022 (JP) .................. 2022-012859

(51) Int. Cl.
*B60W 60/00* (2020.01)
*G06V 20/58* (2022.01)

(52) U.S. Cl.
CPC .......... *B60W 60/001* (2020.02); *G06V 20/58* (2022.01); *B60W 2554/404* (2020.02); *B60W 2554/80* (2020.02)

(58) Field of Classification Search
CPC ......... B60W 60/001; B60W 2554/404; B60W 2554/80; B60W 2552/53; B60W 60/0015; B60W 2554/402; B60W 2554/4041; B60W 2554/4042; B60W 2556/25; B60W 40/02; B60W 2420/403; G06V 20/58
See application file for complete search history.

(56) References Cited

U.S. PATENT DOCUMENTS

| | | | | |
|---|---|---|---|---|
| 11,117,584 B2* | 9/2021 | D'sa | ................. | B60W 30/0956 |
| 11,608,067 B2* | 3/2023 | Xu | ........................ | B60W 40/06 |
| 11,639,194 B2* | 5/2023 | Yamazaki | ............ | B62D 15/025 |
| | | | | 701/41 |
| 11,733,694 B2* | 8/2023 | Matsunaga | ............. | G06F 3/147 |
| | | | | 701/2 |
| 11,745,785 B2* | 9/2023 | Yamazaki | ................ | B62D 1/18 |
| | | | | 701/41 |
| 12,003,894 B1* | 6/2024 | Cardei | ................... | H04N 7/188 |

(Continued)

FOREIGN PATENT DOCUMENTS

JP  2021-100827  7/2021

*Primary Examiner* — Mussa A Shaawat
(74) *Attorney, Agent, or Firm* — Amin, Turocy & Watson, LLP

(57) ABSTRACT

According to an embodiment, a mobile object control device includes a recognizer configured to recognize a surrounding situation of a mobile object on the basis of a first image captured, an action plan generator configured to generate a future action plan of the mobile object on the basis of a recognition result, and a driving controller configured to control at least one of steering and a speed of the mobile object on the basis of the action plan generated. The recognizer recognizes a physical object near the mobile object in a first recognition mode in which a recognition process is performed using a second image obtained by reducing a data amount of the first image and determines that another physical object having a larger risk area than the recognized physical object has been recognized when accuracy of the recognized physical object is less than a threshold value.

11 Claims, 10 Drawing Sheets

(56) References Cited

U.S. PATENT DOCUMENTS

| | | | |
|---|---|---|---|
| 2010/0104199 A1* | 4/2010 | Zhang | G08G 1/166 |
| | | | 382/199 |
| 2016/0313133 A1* | 10/2016 | Zeng | B60W 60/0011 |
| 2018/0033308 A1* | 2/2018 | Litkouhi | G08G 1/166 |
| 2018/0170388 A1* | 6/2018 | Shin | B60W 60/001 |
| 2019/0061765 A1* | 2/2019 | Marden | B60W 30/18163 |
| 2019/0171204 A1* | 6/2019 | Jang | B60W 50/082 |
| 2019/0329771 A1* | 10/2019 | Wray | B60W 30/18154 |
| 2019/0339706 A1* | 11/2019 | Batur | G05D 1/0223 |
| 2020/0310416 A1* | 10/2020 | Matsunaga | G06F 3/147 |
| 2021/0107566 A1* | 4/2021 | Seegmiller | G01C 21/3658 |
| 2021/0122373 A1* | 4/2021 | Dax | B60W 30/18159 |
| 2022/0204005 A1* | 6/2022 | Tsuji | B60W 10/20 |
| 2022/0227367 A1* | 7/2022 | Kario | B60W 30/0956 |
| 2022/0269277 A1* | 8/2022 | Shalev-Shwartz | G06V 20/56 |

* cited by examiner

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2022-012859, filed Jan. 31, 2022, the content of which is incorporated herein by reference.

BACKGROUND

Field of the Invention

The present invention relates to a mobile object control device, a mobile object control method, and a storage medium.

Description of Related Art

In the related art, technology for planning a target trajectory so that an actual detection range of an external sensor such as a camera is wide when an object near the vehicle has been recognized from the external sensor in a vehicle control device that plans a target trajectory of a vehicle on the basis of recognition information from the external sensor is known (for example, Japanese Unexamined Patent Application, First Publication No. 2021-100827).

SUMMARY

Meanwhile, in general, when the resolution of the camera is higher, the recognition performance is better. However, because a data amount increases, the image processing is overloaded and the processing time is prolonged. In contrast, when the resolution is lowered to shorten the processing time, there is a possibility of misrecognizing a physical object. However, a process for a physical object that is likely to be misrecognized is not considered in the related art. Thus, it is difficult to generate a target trajectory corresponding to a surrounding situation of the mobile object and appropriate operation control may not be performed.

Aspects of the present invention have been made in consideration of such circumstances and an objective of the present invention is to provide a mobile object control device, a mobile object control method, and a storage medium capable of executing more appropriate mobile object control.

A mobile object control device, a mobile object control method, and a storage medium according to the present invention adopt the following configurations.

(1): According to an aspect of the present invention, there is provided a mobile object control device including: a recognizer configured to recognize a surrounding situation of a mobile object on the basis of a first image captured by an imager; an action plan generator configured to generate a future action plan of the mobile object on the basis of a recognition result of the recognizer; and a driving controller configured to control at least one of steering and a speed of the mobile object on the basis of the action plan generated by the action plan generator, wherein the recognizer recognizes a physical object near the mobile object in a first recognition mode in which a recognition process is performed using a second image obtained by reducing a data amount of the first image and determines that another physical object having a larger risk area than the recognized physical object has been recognized when accuracy of the recognized physical object is less than a threshold value.

(2): In the above-described aspect (1), the recognizer extracts a first partial image area including the physical object from the first image when the accuracy of the physical object recognized in the first recognition mode is less than the threshold value and recognizes the physical object in a second recognition mode in which a recognition process is performed using a third image having a larger data amount than the second image with respect to the extracted first partial image area, and the action plan generator generates the action plan on the basis of information of the physical object recognized in the second recognition mode when the physical object recognized in the first recognition mode is different from the physical object recognized in the second recognition mode.

(3): In the above-described aspect (1), the data amount includes at least one of resolution and a frame rate.

(4): In the above-described aspect (1), the recognition result of the recognizer includes at least a position, a size, and a type of the physical object.

(5): In the above-described aspect (1), the recognizer extracts a second partial image area including markings for dividing an area where the mobile object moves from the first image when the physical object recognized in the first recognition mode includes another mobile object and the markings, recognizes the markings in a second recognition mode in which a recognition process is performed using a third image having a larger data amount than the second image with respect to the extracted second partial image area, and recognizes a position of the other mobile object on the basis of positional relationships between the recognized markings and the other mobile object.

(6): In the above-described aspect (5), the recognizer recognizes the position of the other mobile object on the basis of a positional relationship between a virtual line obtained by extending the marking for dividing the area where the mobile object moves and a marking located within a prescribed distance from the other mobile object.

(7): In the above-described aspect (1), the other physical object having the larger risk area is a physical object predicted to have a larger movement amount for a prescribed time period than a physical object recognized from the second image.

(8): According to an aspect of the present invention, there is provided a mobile object control method including: recognizing, by a computer, a surrounding situation of a mobile object on the basis of a first image captured by an imager; generating, by the computer, a future action plan of the mobile object on the basis of a recognition result; controlling, by the computer, at least one of steering and a speed of the mobile object on the basis of the generated action plan; recognizing, by the computer, a physical object near the mobile object in a first recognition mode in which a recognition process is performed using a second image obtained by reducing a data amount of the first image; and determining, by the computer, that another physical object having a larger risk area than the recognized physical object has been recognized when accuracy of the recognized physical object is less than a threshold value.

(9): According to an aspect of the present invention, there is provided a computer-readable non-transitory storage medium storing a program for causing a computer to: recognize a surrounding situation of a mobile object on the basis of a first image captured by an imager; generate a future action plan of the mobile object on the basis of a recognition result; control at least one of steering and a speed of the mobile object on the basis of the generated action plan; recognize a physical object near the mobile object in a first recognition mode in which a recognition process is performed using a second image obtained by reducing a data amount of the first image; and determine that another physical object having a larger risk area than the recognized physical object has been recognized when accuracy of the recognized physical object is less than a threshold value.

According to the above-described aspects (1) to (9), it is possible to execute more appropriate mobile object control.

DESCRIPTION OF EMBODIMENTS

Embodiments of a mobile object control device, a mobile object control method, and a storage medium of the present invention will be described below with reference to the drawings. In the following description, an example in which a mobile object control device is mounted in a mobile object will be described. The mobile object refers to a structure that can be moved by its own drive mechanism, such as a vehicle, micro-mobility, an autonomous moving robot, a watercraft, or a drone. A mobile object control process includes, for example, driving control for autonomously moving the mobile object by temporarily controlling at least one or both of steering and a speed of the mobile object. The mobile object control process may include giving advice on a driving operation by voice, display, or the like or performing interference control to some extent, for example, in primarily manual driving, or may include controlling an operation on a protective device that protects an occupant of the mobile object. In the following description, it is assumed that the mobile object is a vehicle that moves on the ground and only the configuration and functions for moving the vehicle on the ground will be described. Vehicle driving control may include, for example, various types of driving control that are automated driving control such as a lane keeping assistance system (LKAS), auto lane changing (ALC), and adaptive cruise control (ACC) or driving assistance control such as contact avoidance control, emergency stop control, and lane departure avoidance control during manual driving.

First Embodiment

Overall Configuration

Figure 1:
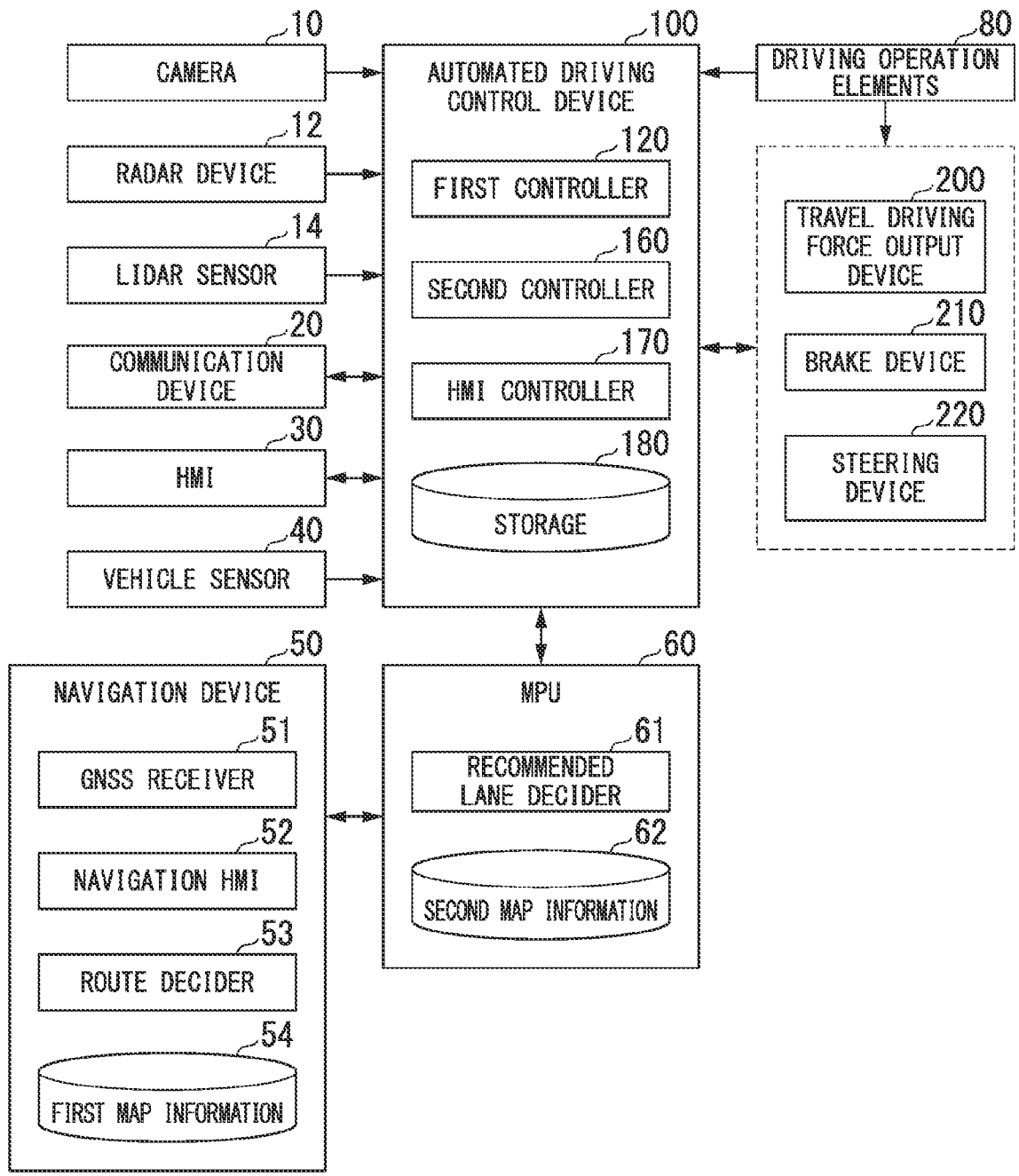
FIG. 1 is a configuration diagram of a vehicle system using a mobile object control device according to a first embodiment.

FIG. 1 is a configuration diagram of a vehicle system 1 using a mobile object control device according to a first embodiment. A vehicle (hereinafter referred to as a host vehicle M) in which the vehicle system 1 is mounted is, for example, a vehicle such as a two-wheeled vehicle, a three-wheeled vehicle, or a four-wheeled vehicle. A driving source of these vehicles is an internal combustion engine such as a diesel engine or a gasoline engine, an electric motor, or a combination thereof. The electric motor operates using electric power generated by a power generator connected to the internal combustion engine or power that is supplied when a secondary battery or a fuel cell is discharged.

For example, the vehicle system 1 includes a camera 10, a radar device 12, a light detection and ranging (LIDAR) sensor 14, a communication device 20, a human machine interface (HMI) 30, a vehicle sensor 40, a navigation device 50, a map positioning unit (MPU) 60, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The camera 10 is an example of an "imager." The automated driving control device 100 is an example of a "mobile object control device."

For example, the camera 10 is a digital camera using a solid-state imaging element such as a charge coupled device (CCD) or a complementary metal oxide semiconductor (CMOS). The camera 10 is attached to any location on the host vehicle M in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera. The camera 10 may be a camera capable of imaging the periphery of the host vehicle M at a wide angle (for example, 360 degrees). The camera 10 may be implemented by combining a plurality of cameras. When the camera 10 has a plurality of cameras, each camera may have a different resolution or frame rate (frames per second (FPS)).

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves of a wavelength close to that of light) to the vicinity of the host vehicle M and measures scattered light. The LIDAR sensor 14 detects a distance to an object on the basis of a time period from light emission to light reception. The radiated light is, for example, pulsed laser light. The LIDAR sensor 14 is attached to any location on the host vehicle M.

The communication device 20 communicates with another vehicle in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 outputs various types of information to the occupant of the host vehicle M under control of an HMI controller 170. The HMI 30 may function as a receiver for receiving an input operation from the occupant. The HMI 30 includes, for example, a display device, a speaker, a microphone, a buzzer, a key, an indicator lamp, and the like. The display device is, for example, a liquid crystal display (LCD), an organic electro luminescence (EL) display device, or the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like. The vehicle sensor 40 may include a position sensor that acquires a position of the vehicle M. The position sensor is, for example, a sensor that acquires position information (longitude/latitude information) from a Global Positioning System (GPS) device. The position sensor may be a sensor that acquires position information using a global navigation satellite system (GNSS) receiver 51 of the navigation device 50.

For example, the navigation device 50 includes the GNSS receiver 51, a navigation HMI 52, and a route decider 53. The navigation device 50 retains first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and retains second map information 62 in a storage device such as an HDD or a flash memory. The recommended lane decider 61 divides the route on the map provided from the navigation device 50 into a plurality of blocks (for example, divides the route every 100 [m] in a traveling direction of the vehicle), and decides on a recommended lane for each block with reference to the second map information 62. The recommended lane decider 61 decides in what lane numbered from the left the vehicle will travel. For example, the recommended lane decider 61 decides on the recommended lane so that the host vehicle M can travel along a reasonable route for traveling to a branching destination when there is a branch point in the route on the map.

The second map information 62 is map information which has higher accuracy than the first map information 54. The second map information 62 includes, for example, information of the center of the lane, information of the boundary of the lane, or the like. The second map information 62 may include road information, traffic regulation information, address information (an address/postal code), facility information, telephone number information, and the like. The second map information 62 may be updated at any time when the communication device 20 communicates with another device.

The driving operation elements 80 include, for example, a steering wheel, an accelerator pedal, a brake pedal, a shift lever, and other operation elements. A sensor for detecting an amount of operation or the presence or absence of an operation is attached to the driving operation element 80 and a detection result is output to the automated driving control device 100 or some or all of the travel driving force output device 200, the brake device 210, and the steering device 220.

Next, the travel driving force output device 200, the brake device 210, and the steering device 220 will be described before the description of the automated driving control device 100. The travel driving force output device 200 outputs a travel driving force (torque) for enabling the host vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the automated driving control device 100 (the second controller 160 to be specifically described below) or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the steering wheel 82 of the driving operation element 80 to change the direction of the steerable wheels.

Next, the automated driving control device 100 will be described. The automated driving control device 100 includes, for example, the first controller 120, the second controller 160, the HMI controller 170, and a storage 180. Each of the first controller 120 and the second controller 160 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as an HDD or a flash memory of the automated driving control device 100 or may be stored in a removable storage medium such as a DVD or a CD-ROM and installed in an HDD or a flash memory of the automated driving control device 100 when the storage medium (the non-transitory storage medium) is mounted in a drive device. The second controller 160 is an example of a "driving controller."

The storage 180 may be implemented by the above-described various storage devices, a solid-state drive (SSD), an electrically erasable programmable read only memory (EEPROM), a read-only memory (ROM), a random-access memory (RAM), or the like. The storage 180 stores, for example, programs, various other types of information, and the like. The above-described map information (the first map information 54 and the second map information 62) may be stored in the storage 180.

Figure 2:
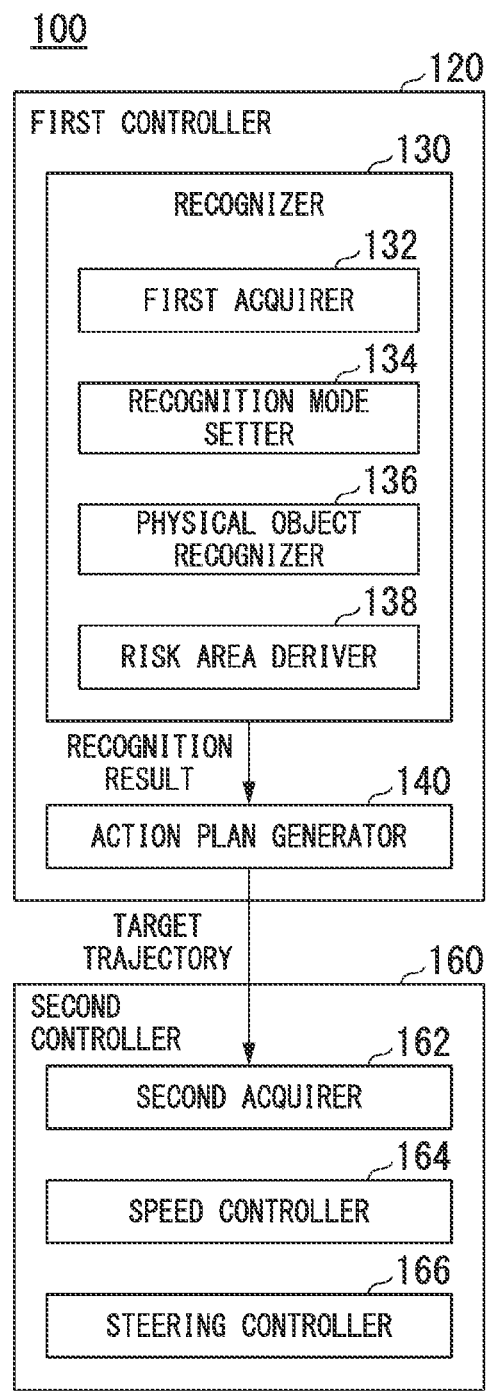
FIG. 2 is a functional configuration diagram of a first controller and a second controller according to the first embodiment.

FIG. 2 is a functional configuration diagram of the first controller 120 and the second controller 160. The first controller 120 includes, for example, a recognizer 130 and the action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road signs, or the like with which pattern matching is possible) in parallel and performing comprehensive evaluation by assigning scores to both recognition processes.

The recognizer 130 recognizes a surrounding situation of the host vehicle M. The recognizer 130 includes, for example, a first acquirer 132, a recognition mode setter 134, a physical object recognizer 136, and a risk area deriver 138.

The first acquirer 132 acquires, for example, data of detection results of some or all of the camera 10, the radar device 12, and the LIDAR sensor 14. The first acquirer 132 may perform a process of converting a coordinate system (for example, a camera coordinate system of a forward viewing angle) of an image (hereinafter referred to as a camera image) captured by the camera 10 into a coordinate system (a vehicle coordinate system or a bird's-eye coordinate system) based on a position of the host vehicle M when the host vehicle M is seen from above. The camera image is an example of a "first image" and includes not only a still image but also a moving image.

The recognition mode setter 134 sets a recognition mode when the physical object recognizer 136 recognizes a physical object with respect to data acquired by the first acquirer 132. The recognition mode includes, for example, a first recognition mode and a second recognition mode having a larger amount of data used for physical object recognition than the first recognition mode, but other recognition modes having different data amounts may be included. For example, when the data acquired by the first acquirer 132 is image data (hereinafter referred to as a camera image) captured by the camera 10, the data amount includes at least one of the image resolution (the number of pixels) and the frame rate. The data amount may include the presence or absence of a detection result of the radar device 12 or the LIDAR sensor 14 and the data amount (for example, a detection range or a detection period) for the detection result.

The recognition mode setter 134 may set a predetermined recognition mode among a plurality of recognition modes or may set a recognition mode on the basis of the recognition result of the physical object recognizer 136. For example, the recognition mode setter 134 sets the first recognition mode when a prescribed physical object is not recognized by the physical object recognizer 136 or when the accuracy of the recognized physical object is greater than or equal to a threshold value. The prescribed physical object is a physical object that affects the driving control of the host vehicle M, for example, a traffic participant such as another vehicle (including a motorcycle), a pedestrian, or a bicycle or a road structure such as a marking for dividing an area where the host vehicle M travels (a mobile object moves), a curb, or a median strip. Accuracy is an index value that indicates the certainty of the physical object. The accuracy may be rephrased as the reliability or likelihood. The recognition mode setter 134 sets the second recognition mode, for example, when the accuracy of the recognized physical object is less than a threshold value.

The recognition mode setter 134 may generate data corresponding to the set recognition mode from the data acquired by the first acquirer 132. For example, when the first recognition mode has been set, the recognition mode setter 134 generates a second image having lower resolution (a smaller resolution value) than resolution (reference resolution) of the camera image. The recognition mode setter 134 generates a third image having higher resolution than the second image when the second recognition mode has been set. The resolution of the third image is less than or equal to the resolution of the camera image. Therefore, the recognition mode setter 134 may use a camera image as the third image. The recognition mode setter 134 may generate a second image or a third image in which the frame rate of the camera image is adjusted instead of (or in addition to) adjusting the resolution. When the frame rate is adjusted, the recognition mode setter 134 reduces the frame rate, for example, by thinning out image frames at prescribed intervals from a frame rate (a reference frame rate) of the camera image.

When images are captured at different resolutions and frame rates by the camera 10, the recognition mode setter 134 may select a camera image corresponding to the set recognition mode.

The physical object recognizer 136 performs a sensor fusion process using the recognition mode set by the recognition mode setter 134 for detection result data of some or all of the camera 10, the radar device 12, and the LIDAR sensor 14 acquired by the first acquirer 132 and recognizes a physical object located within a prescribed distance from the host vehicle M. Examples of the physical object include traffic participants such as other vehicles, pedestrians, and bicycles and road structures such as markings, curbs, median strips, road signs, traffic signals, railroad crossings, and pedestrian crossings.

For example, the physical object recognizer 136 performs a prescribed image analysis process using an image of a data amount associated with the recognition mode set by the recognition mode setter 134 and recognizes a physical object included in an image according to a matching process with reference to a predefined pattern matching model or the like on the basis of image information of an analysis result. The image analysis process includes, for example, an edge extraction process of extracting edge points having large luminance differences from neighboring pixels and acquiring an outline of the physical object by connecting the extracted edge points, a process of extracting feature quantities from the color, shape, size, and the like within the contour, and the like. A model is, for example, a trained model such as a deep neural network (DNN) in which an analysis result or data acquired by the first acquirer 132 is input and a type (category) of physical object included in the image and the like are output, but is not limited thereto. For example, the model may be stored in the storage 180 or may be acquired from an external device via the communication device 20. The model may be appropriately updated by feedback control of recognition results, update data from an external device, or the like.

The physical object recognizer 136 may output accuracy indicating that the physical object in the image is a physical object (a type of physical object) defined in a model in the matching process using the analysis result and the model. For example, the accuracy may be defined in the model or may be set on the basis of a degree of matching (similarity) or the like in the matching process.

When a physical object has been recognized, the physical object recognizer 136 recognizes a position, a speed (an absolute speed or a relative speed), acceleration (absolute acceleration or relative acceleration), a traveling direction (moving direction), and the like of the physical object. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by an area. The "state" of a physical object may include acceleration or jerk of another vehicle or an "action state" (for example, whether or not a lane change is being made or intended) when the physical object is a mobile object such as another vehicle.

Also, for example, when the marking has been recognized, the physical object recognizer 136 may recognize a lane in which the host vehicle M is traveling (a traveling lane). For example, the physical object recognizer 136 recognizes the traveling lane by comparing a pattern of road markings (for example, an arrangement of solid lines and broken lines) obtained from the second map information 62 with a pattern of markings (road markings) in the vicinity of the host vehicle M recognized from an image captured by the camera 10. Also, the physical object recognizer 136 may recognize a traveling path boundary (a road boundary) including a curb, a median strip, or the like as well as a marking. In this recognition, a position of the host vehicle M acquired from the navigation device 50 or a processing result of the INS may be taken into account.

When the traveling lane of the host vehicle M is recognized, the physical object recognizer 136 may recognize a position or orientation of the host vehicle M with respect to the traveling lane. In this case, the physical object recognizer 136 may recognize a gap of a reference point of the host vehicle M from the center of the lane and an angle formed with respect to a line connected to the center of the lane in a traveling direction of the host vehicle M as a relative position and orientation of the host vehicle M related to the traveling lane. Alternatively, the physical object recognizer 136 may recognize a position of the reference point of the host vehicle M related to one side end portion (a road boundary) of the traveling lane or the like as a relative position of the host vehicle M related to the traveling lane.

The risk area deriver 138 derives an area of risks potentially distributed or potentially located near the physical object (hereinafter referred to as a risk area) recognized by the physical object recognizer 136. The risk is, for example, a risk of a physical object affecting the host vehicle M. More specifically, the risk is, for example, a risk that forces the host vehicle M to brake or steer suddenly due to the sudden movement of the physical object. The risk may be a risk of the host vehicle M affecting the physical object. Hereinafter, the level of this risk is treated as a quantitative indicator value and the indicator value is described as "risk potential." An area where the risk potential is greater than or equal to a threshold value is derived as the risk area. The risk area deriver 138 may adjust the risk area on the basis of the accuracy of the physical object recognized by the physical object recognizer 136. The physical object recognizer 136 outputs a recognition result to the action plan generator 140.

The action plan generator 140 generates a future action plan of the host vehicle M on the basis of a recognition result of the recognizer 130. The action plan generator 140 generates a future target trajectory along which the host vehicle M will automatically travel (independently of the driver's operation) so that the host vehicle M can generally travel in the recommended lane decided on by the recommended lane decider 61 and cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generator 140 may set an automated driving event when a target trajectory is generated. Automated driving events include a constant-speed traveling event, a low-speed tracking event, a lane change event, a branching-point-related movement event, a merging-point-related movement event, a contact avoidance event, an emergency stop event, a takeover event, and the like. The action plan generator 140 generates a target trajectory according to an activated event. When driving control or a prescribed event of the host vehicle M or the like is executed, the action plan generator 140 may propose (recommend) the execution of the driving control or event to the occupant and may generate the corresponding target trajectory when the proposal is approved.

The second controller 160 controls the travel driving force output device 200, the brake device 210, and the steering device 220 so that the host vehicle M passes along the target trajectory generated by the action plan generator 140 at the scheduled times.

The second controller 160 includes, for example, a second acquirer 162, a speed controller 164, and a steering controller 166. The second acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes feedforward control according to the curvature of the road in front of the host vehicle M and feedback control based on deviation from the target trajectory in combination.

The HMI controller 170 notifies an occupant (a driver) of the host vehicle M of prescribed information through the HMI 30. The prescribed information includes, for example, information about driving control or prescribed events of the host vehicle M. For example, the HMI controller 170 causes the HMI 30 to output warning information or the like when contact avoidance control, emergency stop control, or the like is performed. The HMI controller 170 may generate an image including the prescribed information described above and display the generated image on the display device of the HMI 30 or may generate a sound indicating the prescribed information and transmit the generated sound to the speaker of the HMI 30. The HMI controller 170 may, for example, output information received by the HMI 30 to the communication device 20, the navigation device 50, the first controller 120, and the like.

Generation of Action Plan Based on Recognition Result

Next, a specific example of action plan generation based on a recognition result of the recognizer 130 will be described. Although physical object recognition based on camera images will be mainly described below, physical object recognition based on the detection results of the radar device 12 and the LIDAR sensor 14 is also performed.

Figure 3:
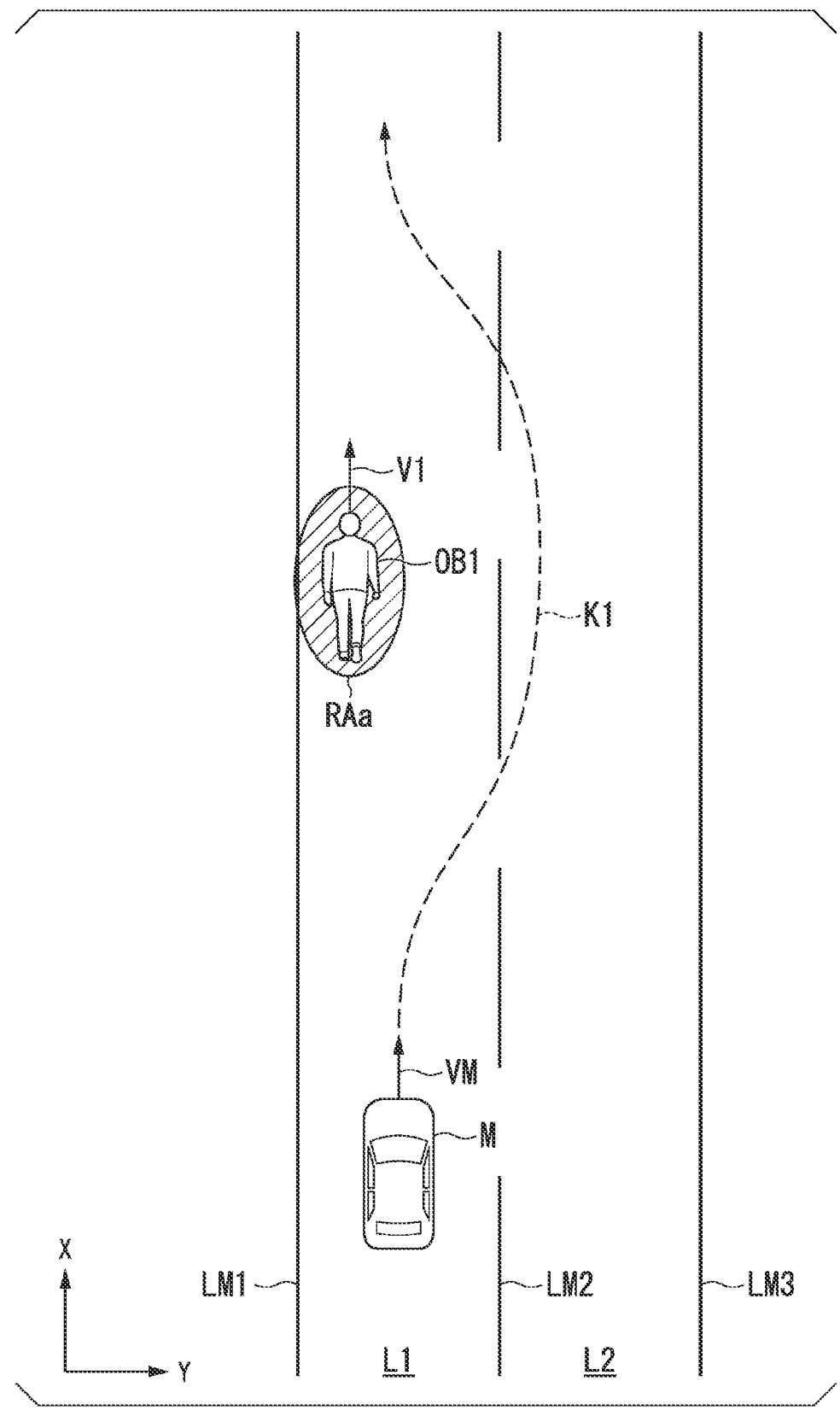
FIG. 3 is a diagram for describing the generation of an action plan based on a recognition result of a recognizer.

FIG. 3 is a diagram for describing the generation of an action plan based on a recognition result of the recognizer 130. In the example of FIG. 3, two lanes L1 and L2 in which traveling is possible in the same direction (an X-axis direction in FIG. 3) are shown. The lane L1 is defined by markings LM1 and LM2 and the lane L2 is defined by markings LM2 and LM3. In the example of FIG. 3, the host vehicle M traveling at a speed VM in the extending direction of the lane L1 (the X-axis direction in FIG. 3) and a physical object OB1 moving in the lane L1 at a speed V1 in front of the host vehicle M are shown. The physical object OB1 is assumed to be a pedestrian.

For example, when the HMI 30 has received an instruction for starting automated driving control from the occupant of the host vehicle M, the recognition mode setter 134 sets the first recognition mode as an initial recognition mode. The physical object recognizer 136 recognizes the surrounding situation of the host vehicle M using the second image associated with the first recognition mode and recognizes a position, a size, a type, and the like of the physical object OBE The physical object recognizer 136 acquires the accuracy of the recognized physical object OB1 and recognizes the speed V1 or a moving direction of the physical object OB1. The physical object recognizer 136 recognizes positions, sizes, and types of the markings LM1 to LM3.

The risk area deriver 138 derives a risk area of the physical object OB1 that is likely to come into contact with the host vehicle M on the basis of a recognition result of the physical object recognizer 136.

Figure 4:
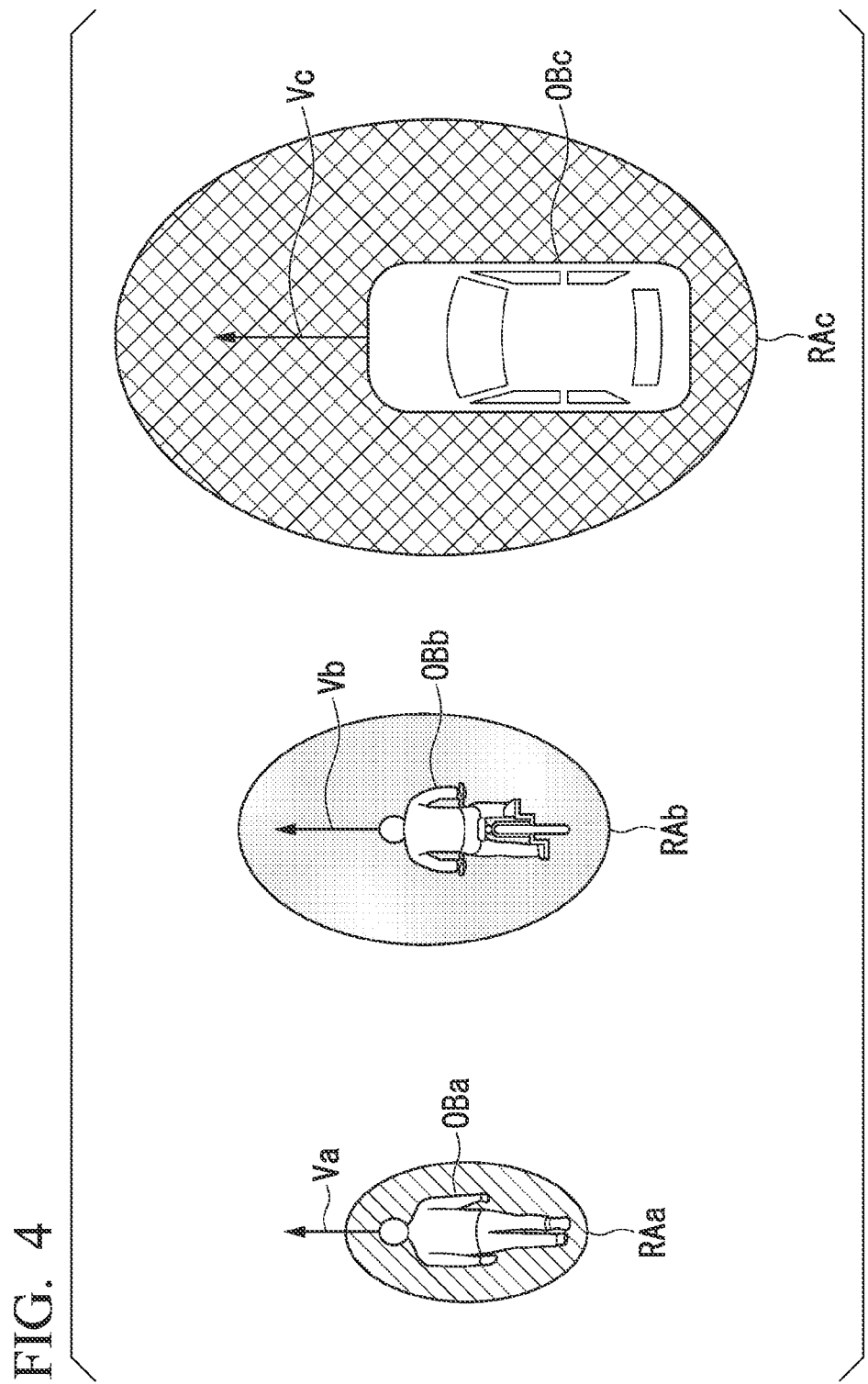
FIG. 4 is a diagram for describing a risk area for each physical object.

FIG. 4 is a diagram for describing the risk area for each physical object. In the example of FIG. 4, a pedestrian, a two-wheeled vehicle (a motorcycle), and a four-wheeled vehicle are shown as examples of physical objects. Hereinafter, for convenience of description, they may be referred to as a pedestrian OBa, a two-wheeled vehicle OBb, and a four-wheeled vehicle OBc.

The risk area deriver 138 derives a risk area where the risk potential increases as a distance from the physical object decreases and the risk potential decreases as the distance from the physical object increases. The risk area deriver 138 may make an adjustment so that the risk potential increases as a distance between the host vehicle M and the physical object decreases (in other words, the risk potential decreases as the distance between the host vehicle M and the physical object increases).

The risk area deriver 138 may adjust the risk area in accordance with the type of physical object. For example, when the physical object is the pedestrian OBa and when the physical object is the two-wheeled vehicle OBb, even if their positions, moving directions, and speeds (speeds Va and Vb shown in FIG. 4) during recognition are the same, their movement amounts may be significantly different for a subsequent prescribed time period. The pedestrian OBa and the two-wheeled vehicle OBb are different in size of the physical object itself from the four-wheeled vehicle OBc. Therefore, the risk area deriver 138 derives the risk area in accordance with the type of physical object. Specifically, the risk area deriver 138 makes an adjustment so that a risk area increases as a predicted value of the movement amount for a prescribed time period (hereinafter referred to as a predicted movement amount) increases. Instead of (or in addition to) the adjustment described above, the risk area deriver 138 makes an adjustment so that the risk area increases as the size of the physical object increases.

In the example of FIG. 4, the two-wheeled vehicle OBb can move at a higher speed than the pedestrian OBa and has a large predicted movement amount. Thus, a risk area RAb of the two-wheeled vehicle OBb is larger than a risk area RAa of the pedestrian OBa. A size of the four-wheeled vehicle OBc is larger than that of the two-wheeled vehicle OBb even if the predicted movement amount of the four-wheeled vehicle OBc is the same as that of the two-wheeled vehicle OBb. Thus, a risk area RAc of the four-wheeled vehicle OBc is larger than the risk area RAb. By deriving the risk area according to the type of physical object in this way, the risk area can be derived more quickly.

The risk area deriver 138 may adjust the risk area according to the speed or the moving direction of the physical object. For example, the risk area deriver 138 may derive a risk area based on the risk potential by increasing the risk potential as an absolute velocity or absolute acceleration of the physical object increases. Instead of (or in addition to) the absolute velocity or the absolute acceleration of the physical object, the risk potential may be appropriately decided in accordance with a relative velocity and relative acceleration between the host vehicle M and the physical object, time to collision (TTC), a predicted contact position, or the like. The risk potential may be adjusted in accordance with a surrounding situation such as a road shape, a degree of congestion, weather, or time of day.

Here, the physical object recognizer 136 determines whether or not the accuracy of the recognized physical object is greater than or equal to a threshold value and causes the risk area deriver 138 to derive the risk area for the recognized physical object when the accuracy of the recognized physical object is greater than or equal to the threshold value. In contrast, when it is determined that the accuracy is not greater than or equal to the threshold value (when it is determined that the accuracy is less than the threshold value), the physical object recognizer 136 causes the risk area deriver 138 to derive the risk area by assuming that another physical object with a larger risk area than the recognized physical object has been recognized. Another physical object whose risk area is larger is, for example, a physical object whose predicted movement amount is larger than that of the recognized physical object (for example, a physical object that can move at a higher speed than the recognized physical object). Another physical object is, for example, a different type of physical object.

For example, the physical object recognizer 136 considers that another physical object which is predetermined has been recognized by considering a physical object to be a two-wheeled vehicle when the accuracy is less than a threshold value for a type of physical object of a pedestrian, considering a physical object to be a four-wheeled vehicle in the case of a two-wheeled vehicle, or the like. The physical object recognizer 136 may select another physical object in accordance with the accuracy or speed of the physical object or the like. In this case, the physical object recognizer 136 selects a physical object so that the risk area increases as the accuracy decreases and/or the speed increases. For example, when the pedestrian has been recognized, the physical object recognizer 136 considers a physical object to be a two-wheeled vehicle if the accuracy is less than a first prescribed value and considers the physical object to be a four-wheeled vehicle if the accuracy is less than a second prescribed value smaller than the first prescribed value.

Figure 5:
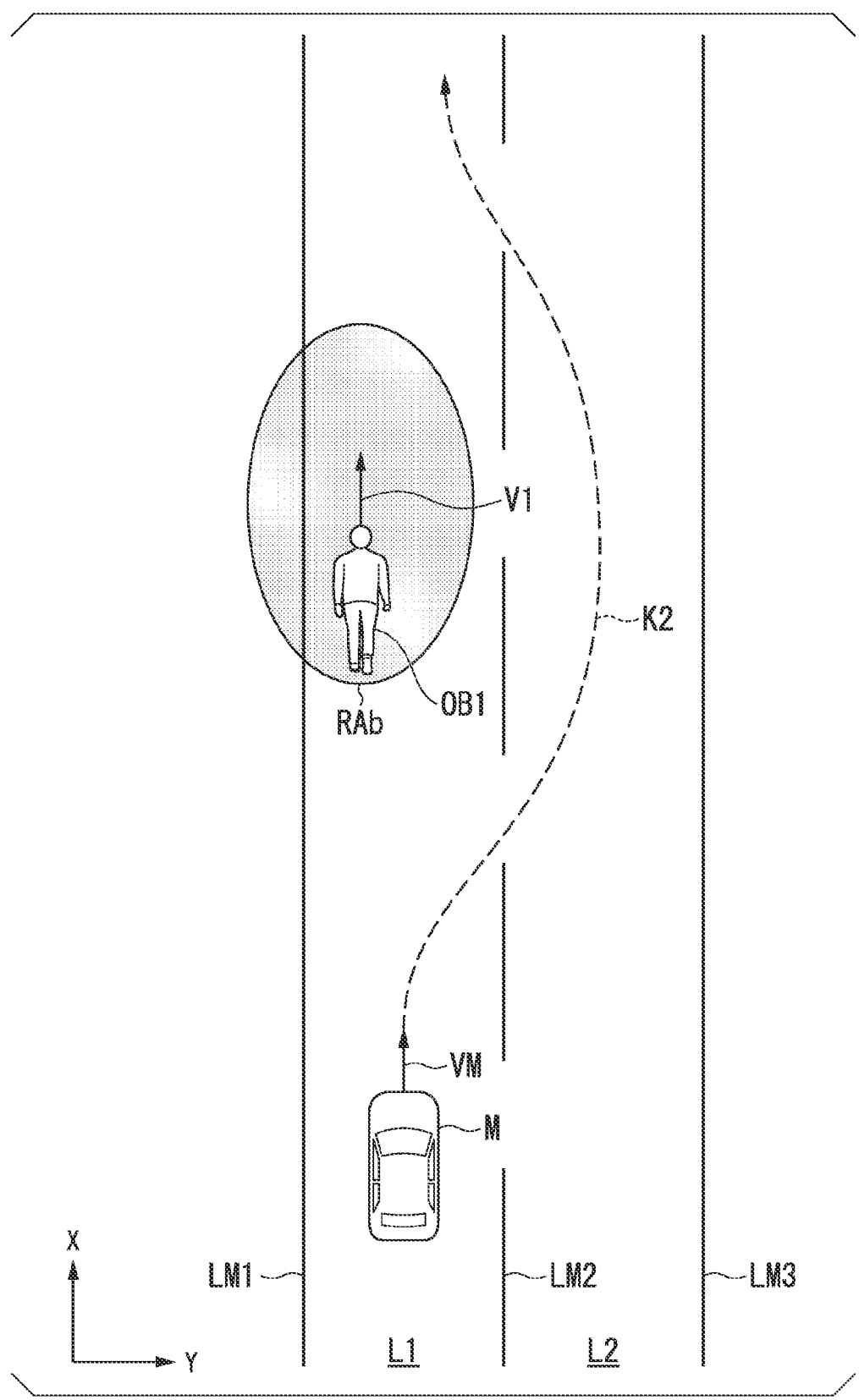
FIG. 5 is a diagram for describing a risk area when accuracy of recognizing a physical object is less than a threshold value.

In the example of FIG. 3, because the accuracy of recognizing the physical object OB1 as a pedestrian is greater than or equal to the threshold value, the risk area RAa associated with the pedestrian is set on the basis of the position of the physical object OB1. FIG. 5 is a diagram for describing the risk area when the accuracy of recognizing the physical object OB1 is less than the threshold value. In the example of FIG. 5, because the accuracy of recognizing the physical object OB1 as a pedestrian is less than the threshold value, the physical object OB1 is considered to be a two-wheeled vehicle and the risk area RAb associated with the two-wheeled vehicle is set on the basis of a position of the physical object OB1.

The action plan generator 140 generates a target trajectory so that the host vehicle M travels at a position separated from the risk area by a prescribed distance to prevent the risk area from being come into contact with a future trajectory of the host vehicle M. Therefore, in the first embodiment, a target trajectory K1 based on the risk area RAa is generated as shown in FIG. 3 when the accuracy of recognizing the physical object OB1 is greater than or equal to the threshold value and a target trajectory K2 based on the risk area RAb is generated as shown in FIG. 5 when the accuracy of recognizing the physical object OB1 is less than the threshold value. Thereby, when the presence of a physical object is recognized but the type of the physical object is not identified, it is possible to generate a target trajectory with higher safety by setting a larger risk area. Because the generation of the action plan described above enables fast physical object recognition using an image with a small amount of data, more appropriate driving control of the host vehicle M corresponding to the surrounding situation can be implemented.

Processing Flow of First Embodiment

Next, a flow of a process executed by the automated driving control device 100 of the first embodiment will be described. A case where an action plan is generated on the basis of a risk area mainly on the basis of a physical object recognition result in a process executed by the automated driving control device 100 in the following process of the flowchart will be mainly described. The process described below may be iteratively executed at prescribed timings.

Figure 6:
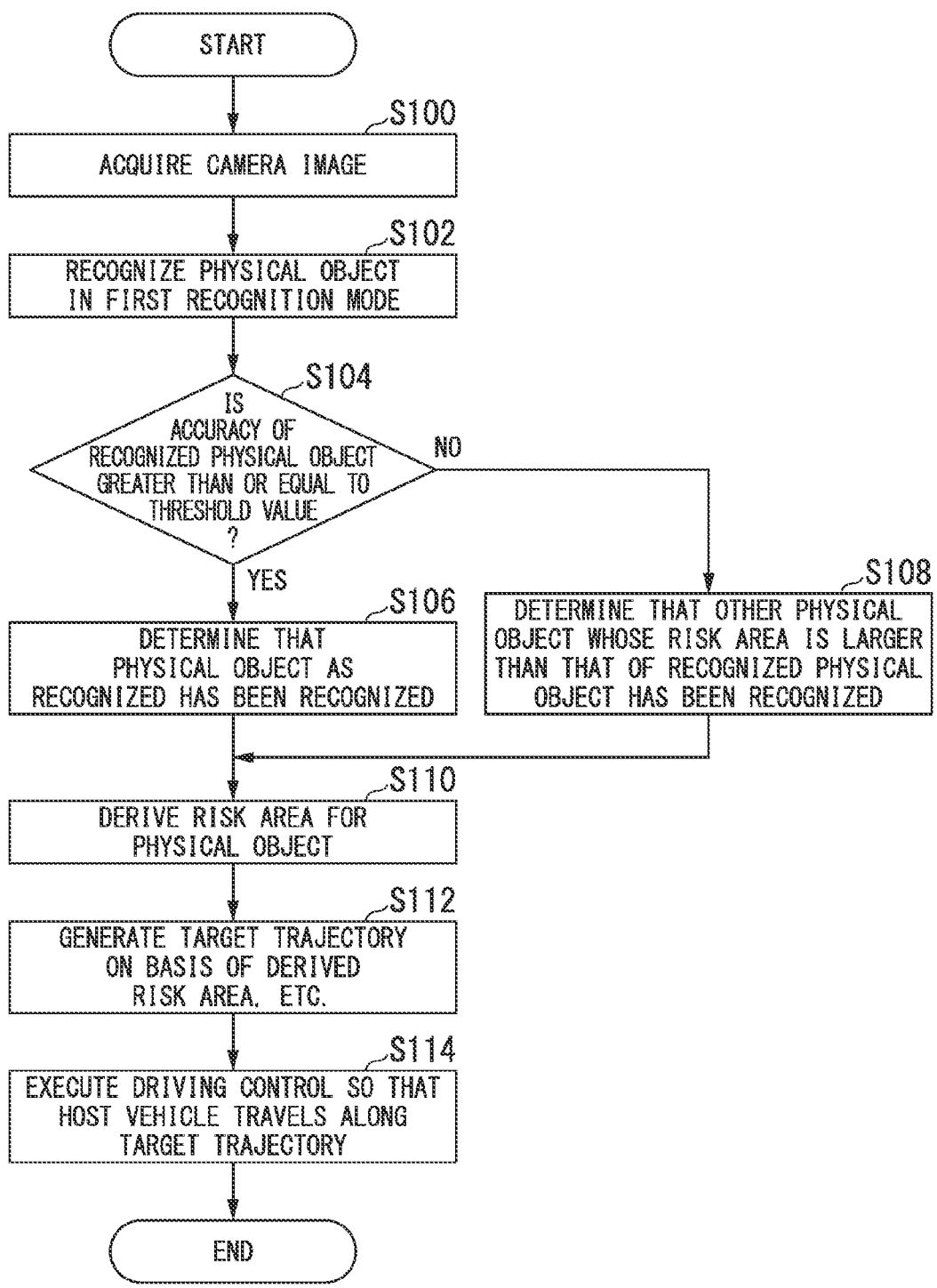
FIG. 6 is a flowchart showing an example of a flow of a process executed by an automated driving control device in the first embodiment.

FIG. 6 is a flowchart showing an example of the flow of the process executed by the automated driving control device 100 in the first embodiment. In the example of FIG. 6, the first acquirer 132 acquires a camera image (a first image) and the like (step S100). Subsequently, the physical object recognizer 136 recognizes a physical object near the host vehicle M in the first recognition mode using a second image generated from the camera image (step S102). Subsequently, when the physical object has been recognized, the physical object recognizer 136 determines whether or not the accuracy of the recognized physical object is greater than or equal to a threshold value (step S104). When it is determined that the accuracy of the recognized physical object is greater than or equal to the threshold value, the physical object recognizer 136 assumes that the physical object as recognized has been recognized. When it is determined that the accuracy of the recognized physical object is less than the threshold value, the physical object recognizer 136 assumes that another physical object having a larger risk area than the recognized physical object has been recognized (step S108).

Subsequently, the risk area deriver 138 derives the risk area for the physical object recognized by the physical object recognizer 136 (step S110). Subsequently, the action plan generator 140 generates a target trajectory based on the derived risk area or the like (step S112). Subsequently, the second controller 160 executes driving control for controlling at least one of steering and a speed of the host vehicle M so that the host vehicle M travels along the generated target trajectory and causes the host vehicle M to travel (step S114). Thereby, the process of the present flowchart ends.

According to the first embodiment described above, the automated driving control device (an example of a mobile object control device) 100 includes the recognizer 130 configured to recognize a surrounding situation of a host vehicle (an example of a mobile object) M on the basis of a first image captured by a camera (an example of an imager) 10; the action plan generator 140 configured to generate a future action plan of the host vehicle M on the basis of a recognition result of the recognizer 130; and a driving controller (the second controller 160) configured to control at least one of steering and a speed of the host vehicle M on the basis of the action plan generated by the action plan generator 140, wherein the recognizer 130 recognizes a physical object near the mobile object in a first recognition mode in which a recognition process is performed using a second image obtained by reducing a data amount of the first image and determines that another physical object having a larger risk area than the recognized physical object has been recognized when accuracy of the recognized physical object is less than a threshold value, whereby it is possible to execute more appropriate mobile object control.

According to the first embodiment, for example, it is possible to obtain the recognition result more quickly by performing a recognition process in the first recognition mode using a low-resolution image and to execute more appropriate driving control corresponding to a surrounding situation of the host vehicle M even if there is a physical object that is likely to be misrecognized because a target trajectory is generated on the basis of a risk area corresponding to the accuracy of the recognition result.

According to the first embodiment, because a more real-time recognition result is obtained, for example, when the host vehicle M is close to the physical object, the initial action of driving control such as contact avoidance and emergency stop can be hastened and safer vehicle control can be implemented.

Second Embodiment

Next, a second embodiment will be described. The second embodiment is different from the first embodiment in that, when the accuracy of a recognition result is less than a threshold value, a partial image area (an example of a first partial image area) including a physical object within a camera image is extracted and the physical object is recognized in a second recognition mode using an image of the extracted area.

Therefore, the following description will focus mainly on the differences described above. In the second embodiment, because a configuration similar to that in the first embodiment can be applied, description will be given using the configuration of the automated driving control device 100 shown in the first embodiment. The same is also true for a third embodiment to be described below.

Processing Flow of Second Embodiment

Figure 7:
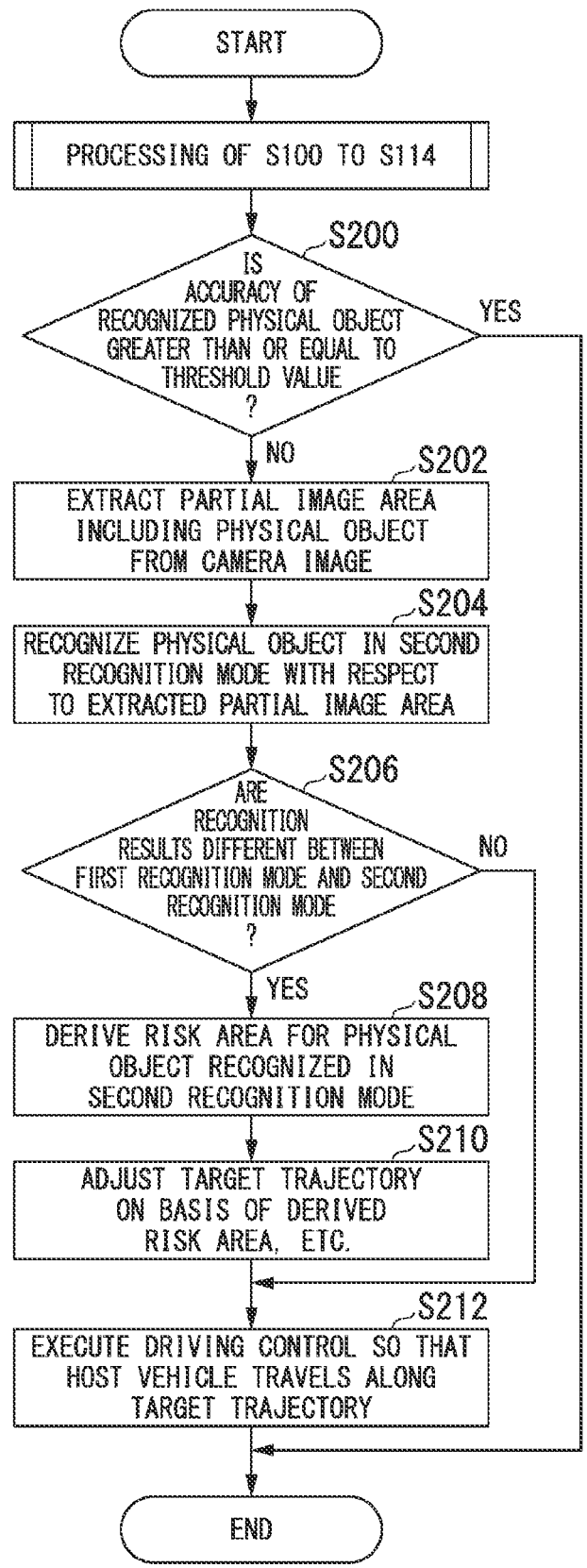
FIG. 7 is a flowchart showing an example of a flow of a process executed by an automated driving control device in a second embodiment.

FIG. 7 is a flowchart showing an example of a flow of a process executed by the automated driving control device 100 in the second embodiment. The process shown in FIG. 7 is different in that the processing of steps S200 to S212 is added after steps S100 to S114 shown in FIG. 6. Therefore, the processing of steps S200 to S212 will be mainly described below.

In the example of FIG. 7, after the processing of step S114, the physical object recognizer 136 determines whether or not the accuracy of the recognized physical object is greater than or equal to the threshold value (step S200). When it is determined that the accuracy is not greater than or equal to the threshold value (or is less than the threshold value), the physical object recognizer 136 performs a cropping process of extracting a partial image area containing the physical object from the camera image on the basis of position information of the recognized physical object (step S202). The partial image area is, for example, a bounding box surrounding the outline (circumference) of the recognized physical object. In the partial image area, an area of the bounding box may be adjusted in accordance with the speed or moving direction of the physical object and the relative position from the host vehicle M or an adjustment may be made so that the partial image area increases as the accuracy decreases.

Subsequently, the physical object recognizer 136 generates a third image having a larger amount of data than the second image for the extracted partial image area and performs a physical object recognition process using the generated third image in the second recognition mode (step S204). In the processing of step S204, the physical object recognizer 136 may perform the physical object recognition process by increasing the amount of data from the radar device 12 or the LIDAR sensor 14.

Subsequently, the physical object recognizer 136 determines whether or not the recognition results are different between the first recognition mode and the second recognition mode (step S206). The different recognition results indicate, for example, that at least one of the recognized physical object's position, size, and type is different beyond an allowable range. In addition to the above, a case where a moving direction difference is a prescribed angle or more or a case where a movement amount difference is a prescribed amount or more may be included. When it is determined that the recognition results are different between the first recognition mode and the second recognition mode, the risk area deriver 138 derives a risk area for the physical object recognized in the second recognition mode (step S208).

Subsequently, the action plan generator 140 adjusts the existing target trajectory on the basis of a risk area or the like derived in the processing of step S208 (step S210). In the processing of step S210, the action plan generator 140 may generate a target trajectory on the basis of the second risk area, for example, when a risk area recognized in the second recognition mode (hereinafter referred to as a second risk area) is larger than a risk area for a physical object recognized in the first recognition mode (hereinafter referred to as a first risk area). The action plan generator 140 may control an adjustment amount of an already generated target trajectory on the basis of an enlargement ratio of the second risk area to the first risk area or the like. When the second risk area is smaller than the first risk area, the action plan generator 140 may regenerate the target trajectory on the basis of the second risk area or may maintain a current target trajectory. When the second risk area is smaller, the host vehicle M is unlikely to come into contact with the physical object even if the current target trajectory is maintained, such that it is possible to suppress the behavior of the host vehicle M from temporarily increasing according to a change in the target trajectory during traveling by maintaining a current target trajectory.

After the processing of step S210, the second controller 160 executes driving control so that the host vehicle M travels along the generated target trajectory (step S212). Thereby, the process of the present flowchart ends. When it is determined that the accuracy of the recognized physical object is greater than or equal to the threshold value in the processing of step S200, the process of the present flowchart ends.

According to the second embodiment described above, in addition to effects similar to those in the first embodiment, because the data amount of the partial image area containing the physical object is increased to perform physical object recognition when the accuracy is less than the threshold value, the accuracy of the position, size, and type of the physical object can be improved and more accurate physical object recognition can be implemented. Therefore, the target trajectory can be appropriately corrected on the basis of the recognition result and more appropriate operation control can be executed.

Third Embodiment

Next, a third embodiment will be described. The third embodiment is different from the first embodiment in that, when markings for defining a lane (an area) where the host vehicle M travels are recognized together with a physical object, a partial image area including a marking within a camera image (an example of a second partial image area) is extracted and a position of the physical object is recognized in a second recognition mode using an image of the extracted area. Therefore, the following description will focus mainly on the differences described above.

Figure 8:
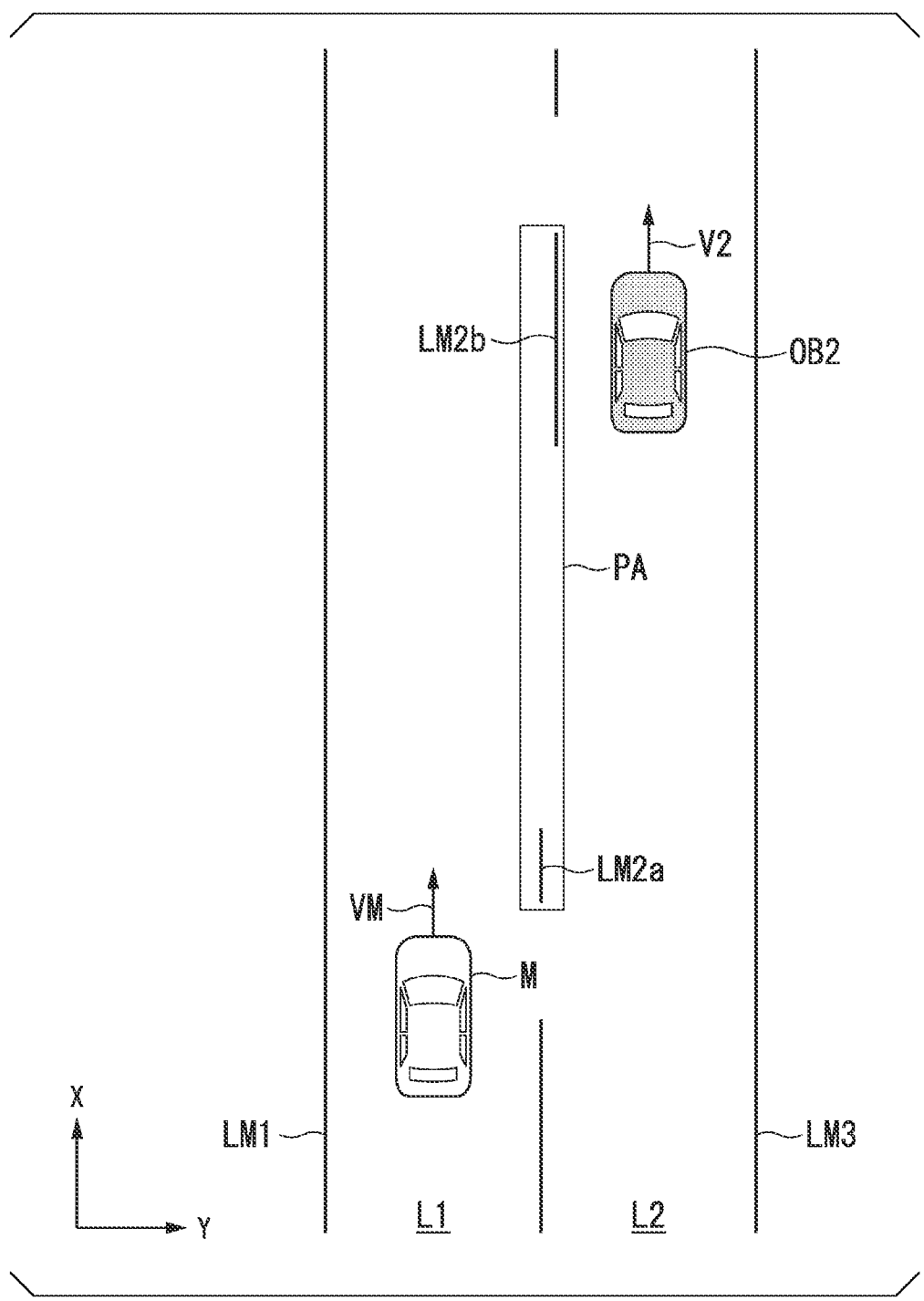
FIG. 8 is a diagram for describing a process of recognizing a partial image area including a lane in a second recognition mode.

FIG. 8 is a diagram for describing recognition of a partial image area including a lane in the second recognition mode. In the example of FIG. 8, it is assumed that, in two lanes where the host vehicle M can travel in the same direction, the host vehicle M is traveling along a lane L1 in the traveling direction (the X-axis direction in FIG. 8) at a speed VM and a physical object OB2 is traveling at a speed V2 in the traveling direction in a lane L2 in front of the host vehicle M. The physical object OB2 is an example of "another mobile object," and is specifically another vehicle (four-wheeled vehicle).

In the example of FIG. 8, the physical object recognizer 136 recognizes a physical object near the host vehicle M in the first recognition mode using the second image and recognizes the physical object OB2 and markings LM1, LM2a, LM2b, and LM3. Here, the physical object recognizer 136 determines whether or not the accuracy of recognizing the physical object OB2 is greater than or equal to the threshold value, extracts a partial image area including a marking from a camera image in a cropping process or the like when the accuracy of recognizing the physical object OB2 is not greater than or equal to the threshold value (or is less than the threshold value), and recognizes the physical object in the second recognition mode using a third image with respect to the extracted partial image area. The partial image area may be, for example, a bounding box surrounding the outline of the marking or the size of the area may be adjusted in accordance with a surrounding situation such as a road shape or accuracy. The partial image area may be an area including a plurality of markings.

For example, the physical object recognizer 136 may extract a partial image area including all markings recognized in the first recognition mode or may extract a partial image area including some markings. Some markings are, for example, markings each having a line length less than a prescribed length. When the line is less than a prescribed length, there is a high possibility that the marking is broken, such that a third image (a high-precision image) targeting an area including the line is recognized and therefore the marking can be recognized more accurately.

Some markings may be markings to be referred to identify a position of the physical object OB2 seen from the host vehicle M and may be, more specifically, markings located between the host vehicle M and the physical object OB2. For example, when the physical object OB2 is located in front of the right side of the host vehicle M, a partial image area including a marking at the right side of the host vehicle M and a marking at the left side of the physical object OB2 is extracted. Some markings may include a plurality of markings. In the example of FIG. 8, a partial image area PA including a part of the markings LM2a and LM2b is extracted as the partial image area.

The physical object recognizer 136 recognizes the markings in the second recognition mode using the third image corresponding to the extracted partial image area PA and recognizes a positional relationship between a marking near the host vehicle M and a marking near the physical object OB2 on the basis of a recognition result. The marking near the host vehicle M may be acquired by referring to map information on the basis of position information of the host vehicle M obtained from the vehicle sensor 40 instead of (or in addition to) recognition from a third image.

Figure 9:
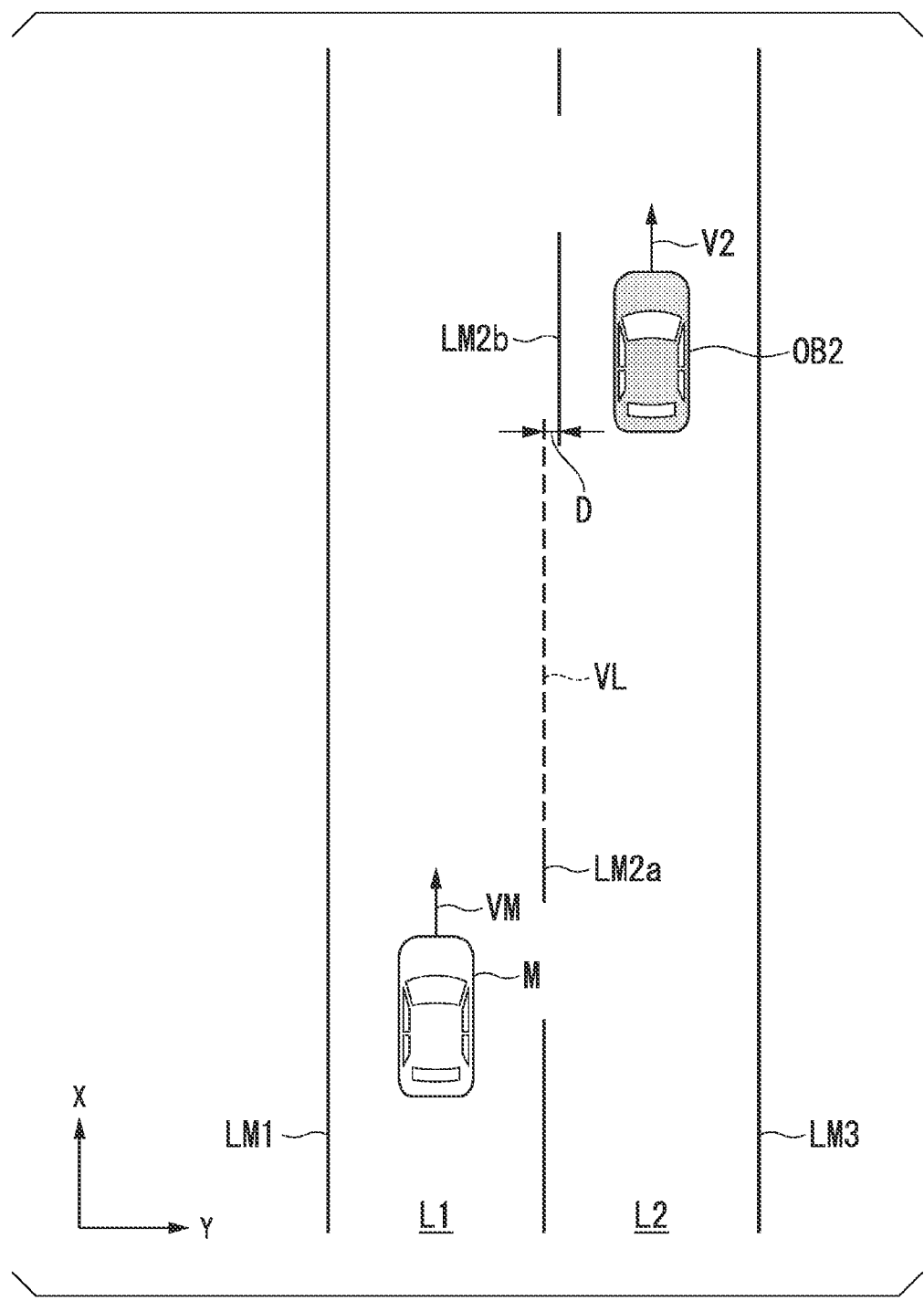
FIG. 9 is a diagram for describing recognition of a positional relationship between markings.

The physical object recognizer 136 recognizes a positional relationship between a right marking LM2a (a marking for defining a host vehicle lane) located closest to the host vehicle M and a left marking LM2b located closest to the physical object OB2 (a marking for defining a traveling lane of a physical object). FIG. 9 is a diagram for describing recognition of the positional relationship between the markings. In the example of FIG. 9, the physical object recognizer 136 sets a virtual line VL obtained by extending the marking LM2a located at the right side of the host vehicle M along the extension direction of lanes L1 and L2 (the X-axis direction in FIG. 9) and determines whether or not the markings LM2a and LM2b are the same marking from the positional relationship between the set virtual line VL and the marking LM2b at the left side of the physical object OB2. When a distance D between lateral positions of the virtual line VL and the marking LM2b (a road width direction or a Y-axis direction) is less than a threshold value, the physical object recognizer 136 recognizes that the marking LM2a and the marking LM2b are the same marking. When the distance D is greater than or equal to the threshold value, the physical object recognizer 136 recognizes that the markings LM2a and LM2b are not the same marking (they are different markings). If there are a plurality of markings at the right side of the host vehicle M or at the left side of the physical object OB2, the above determination may be made for each marking. After recognizing the markings in this way, the physical object recognizer 136 recognizes the position of the physical object OB2 on the basis of a marking recognition result in the second recognition mode. Thereby, because the position of the physical object OB2 can be recognized more accurately, the risk area of the physical object OB2 can be assigned to an appropriate position and a more appropriate target trajectory can be generated.

Processing Flow of Third Embodiment

Figure 10:
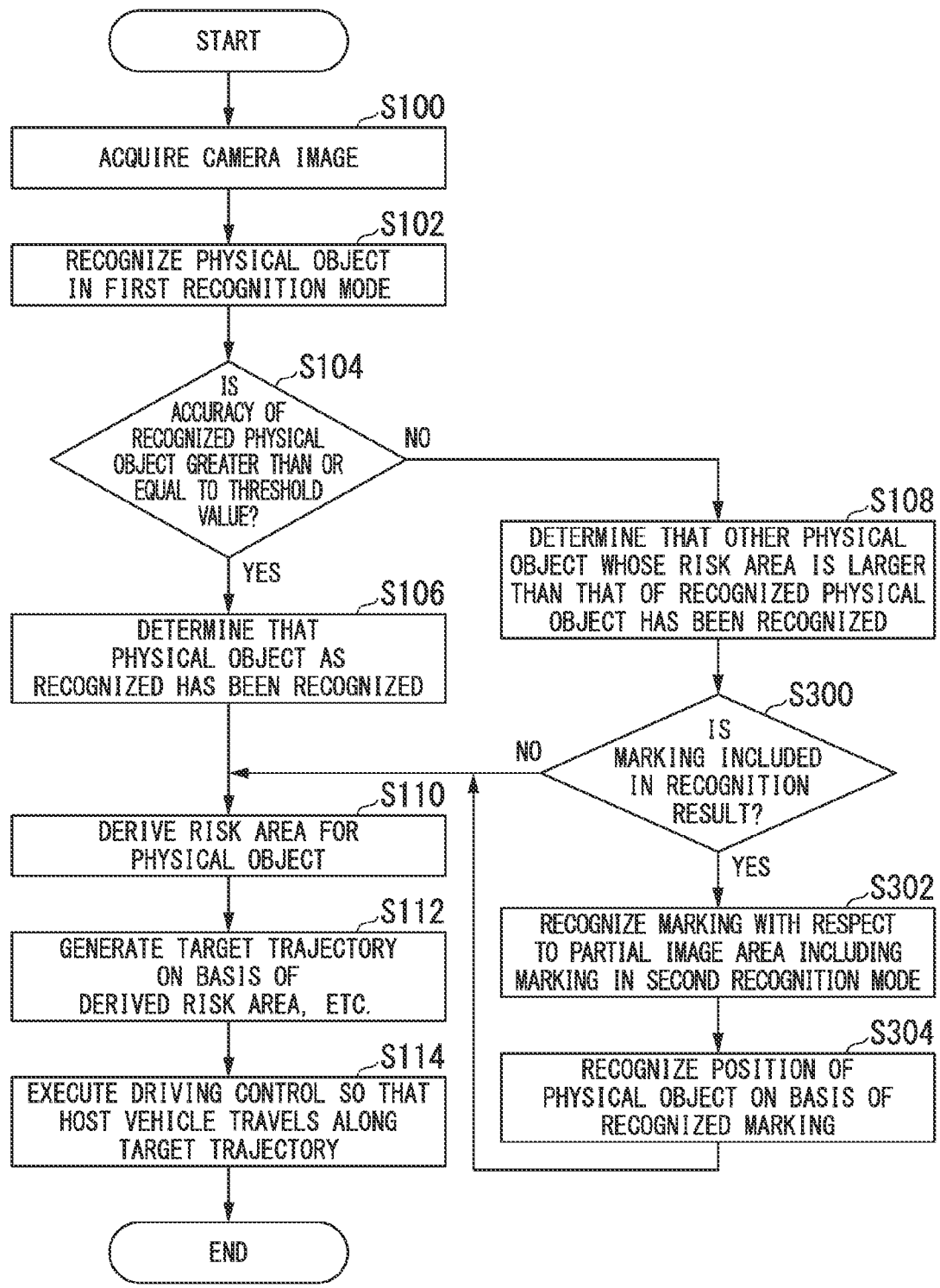
FIG. 10 is a flowchart showing an example of a flow of a process executed by an automated driving control device according to a third embodiment.

FIG. 10 is a flowchart showing an example of a flow of a process executed by the automated driving control device 100 in the third embodiment. The process shown in FIG. 10 is different from steps S100 to S114 shown in FIG. 6 in that the processing of steps S300 to S304 is added between steps S108 and S110. Therefore, the processing of steps S300 to S304 will be mainly described below.

In the example of FIG. 10, after the processing of step S108, the physical object recognizer 136 determines whether or not a marking is included in the physical object of the recognition result (step S300). When it is determined that the marking is included, the physical object recognizer 136 extracts a partial image area including the marking and recognizes the marking in the second recognition mode for the extracted partial image area using a third image (step S302) and recognizes a position of a physical object on the basis of a position of a recognized lane (step S304). After the processing of step S106 or S304 is completed, the processing of step S110 and the subsequent steps is executed.

According to the third embodiment described above, in addition to effects similar to those in the first embodiment, when a marking is included in the recognition result in the first recognition mode, it is possible to recognize a marking with high accuracy in the second recognition mode and recognize a position of a physical object seen from the host vehicle M with high accuracy on the basis of a position of the recognized marking. According to the third embodiment, it is possible to quickly recognize a marking even if a recognition process is performed in the second recognition mode having higher resolution than the first recognition mode because only markings whose shapes and sizes are limited to some extent are targeted for recognition as compared with traffic participants such as a pedestrian and a vehicle. Therefore, a more appropriate target trajectory can be generated in accordance with a surrounding situation.

In the third embodiment, instead of (or in addition to) the markings, road structures other than the markings (for example, curbs and median strips) and the like may be recognized.

Each of the first to third embodiments described above may be combined with some or all of the other embodiments. For example, the marking recognition of the third embodiment is combined with the second embodiment and therefore a more appropriate risk area can be set at a more appropriate position.

The embodiment described above can be represented as follows.

A mobile object control device including:
a storage medium storing computer-readable instructions; and
a processor connected to the storage medium,
wherein the processor executes the computer-readable instructions stored in the storage medium to:
recognize a surrounding situation of a mobile object on the basis of a first image captured by an imager;
generate a future action plan of the mobile object on the basis of a recognition result;
control at least one of steering and a speed of the mobile object on the basis of the generated action plan;
recognize a physical object near the mobile object in a first recognition mode in which a recognition process is performed using a second image obtained by reducing a data amount of the first image; and
determine that another physical object having a larger risk area than the recognized physical object has been recognized when accuracy of the recognized physical object is less than a threshold value.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile object control device comprising:
a recognizer configured to recognize a surrounding situation of a mobile object on the basis of a first image captured by an imager;
an action plan generator configured to generate a future action plan of the mobile object on the basis of a recognition result of the recognizer; and
a driving controller configured to control at least one of steering and a speed of the mobile object on the basis of the action plan generated by the action plan generator,
wherein the recognizer recognizes a physical object near the mobile object in a first recognition mode in which a recognition process is performed using a second image obtained by reducing a data amount of the first image and determines that another physical object having a larger risk area than the recognized physical object has been recognized when accuracy of the recognized physical object is less than a threshold value,
wherein the recognizer extracts a first partial image area including the physical object from the first image when the accuracy of the physical object recognized in the first recognition mode is less than the threshold value and recognizes the physical object in a second recognition mode in which a recognition process is performed using a third image having a larger data amount than the second image with respect to the extracted first partial image area, and
wherein the action plan generator generates the action plan on the basis of information of the physical object recognized in the second recognition mode when the physical object recognized in the first recognition mode is different from the physical object recognized in the second recognition mode.

2. The mobile object control device according to claim 1, wherein the data amount includes at least one of resolution and a frame rate.

3. The mobile object control device according to claim 1, wherein the recognition result of the recognizer includes at least a position, a size, and a type of the physical object.

4. The mobile object control device according to claim 1, wherein the recognizer extracts a second partial image area including markings for dividing an area where the mobile object moves from the first image when the physical object recognized in the first recognition mode includes another mobile object and the markings, recognizes the markings in a second recognition mode in which a recognition process is performed using a third image having a larger data amount than the second image with respect to the extracted second partial image area, and recognizes a position of the other mobile object on the basis of positional relationships between the recognized markings and the other mobile object.

5. The mobile object control device according to claim 4, wherein the recognizer recognizes the position of the other mobile object on the basis of a positional relationship between a virtual line obtained by extending the marking for dividing the area where the mobile object moves and a marking located within a prescribed distance from the other mobile object.

6. The mobile object control device according to claim 1, wherein the other physical object having the larger risk area is a physical object predicted to have a larger movement amount for a prescribed time period than a physical object recognized from the second image.

7. A mobile object control method comprising:
recognizing, by a computer, a surrounding situation of a mobile object on the basis of a first image captured by an imager;
generating, by the computer, a future action plan of the mobile object on the basis of a recognition result;
controlling, by the computer, at least one of steering and a speed of the mobile object on the basis of the generated action plan;
recognizing, by the computer, a physical object near the mobile object in a first recognition mode in which a recognition process is performed using a second image obtained by reducing a data amount of the first image;
determining, by the computer, that another physical object having a larger risk area than the recognized physical object has been recognized when accuracy of the recognized physical object is less than a threshold value;
extracting, by the computer, a first partial image area including the physical object from the first image when the accuracy of the physical object recognized in the first recognition mode is less than the threshold value;

recognizing, by the computer, the physical object in a second recognition mode in which a recognition process is performed using a third image having a larger data amount than the second image with respect to the extracted first partial image area; and generating, by the computer, the action plan on the basis of information of the physical object recognized in the second recognition mode when the physical object recognized in the first recognition mode is different from the physical object recognized in the second recognition mode.

8. A computer-readable non-transitory storage medium storing a program for causing a computer to:

recognize a surrounding situation of a mobile object on the basis of a first image captured by an imager;

generate a future action plan of the mobile object on the basis of a recognition result;

control at least one of steering and a speed of the mobile object on the basis of the generated action plan;

recognize a physical object near the mobile object in a first recognition mode in which a recognition process is performed using a second image obtained by reducing a data amount of the first image;

determine that another physical object having a larger risk area than the recognized physical object has been recognized when accuracy of the recognized physical object is less than a threshold value;

extract a first partial image area including the physical object from the first image when the accuracy of the physical object recognized in the first recognition mode is less than the threshold value;

recognize the physical object in a second recognition mode in which a recognition process is performed using a third image having a larger data amount than the second image with respect to the extracted first partial image area; and generate the action plan on the basis of information of the physical object recognized in the second recognition mode when the physical object recognized in the first recognition mode is different from the physical object recognized in the second recognition mode.

9. A mobile object control device comprising:

a recognizer configured to recognize a surrounding situation of a mobile object on the basis of a first image captured by an imager;

an action plan generator configured to generate a future action plan of the mobile object on the basis of a recognition result of the recognizer; and a driving controller configured to control at least one of steering and a speed of the mobile object on the basis of the action plan generated by the action plan generator, wherein the recognizer recognizes a physical object near the mobile object in a first recognition mode in which a recognition process is performed using a second image obtained by reducing a data amount of the first image and determines that another physical object having a larger risk area than the recognized physical object has been recognized when accuracy of the recognized physical object is less than a threshold value, wherein the recognizer extracts a second partial image area including markings for dividing an area where the mobile object moves from the first image when the physical object recognized in the first recognition mode includes another mobile object and the markings, recognizes the markings in a second recognition mode in which a recognition process is performed using a third image having a larger data amount than the second image with respect to the extracted second partial image area, and recognizes a position of the other mobile object on the basis of positional relationships between the recognized markings and the other mobile object.

10. A mobile object control method comprising:

recognizing, by a computer, a surrounding situation of a mobile object on the basis of a first image captured by an imager;

generating, by the computer, a future action plan of the mobile object on the basis of a recognition result;

controlling, by the computer, at least one of steering and a speed of the mobile object on the basis of the generated action plan;

recognizing, by the computer, a physical object near the mobile object in a first recognition mode in which a recognition process is performed using a second image obtained by reducing a data amount of the first image;

determining, by the computer, that another physical object having a larger risk area than the recognized physical object has been recognized when accuracy of the recognized physical object is less than a threshold value;

extracting, by the computer, a second partial image area including markings for dividing an area where the mobile object moves from the first image when the physical object recognized in the first recognition mode includes another mobile object and the markings;

recognizing, by the computer, the markings in a second recognition mode in which a recognition process is performed using a third image having a larger data amount than the second image with respect to the extracted second partial image area; and recognizing, by the computer, a position of the other mobile object on the basis of positional relationships between the recognized markings and the other mobile object.

11. A computer-readable non-transitory storage medium storing a program for causing a computer to:

recognize a surrounding situation of a mobile object on the basis of a first image captured by an imager;

generate a future action plan of the mobile object on the basis of a recognition result;

control at least one of steering and a speed of the mobile object on the basis of the generated action plan;

recognize a physical object near the mobile object in a first recognition mode in which a recognition process is performed using a second image obtained by reducing a data amount of the first image;

determine that another physical object having a larger risk area than the recognized physical object has been recognized when accuracy of the recognized physical object is less than a threshold value;

extract a second partial image area including markings for dividing an area where the mobile object moves from the first image when the physical object recognized in the first recognition mode includes another mobile object and the markings;

recognize the markings in a second recognition mode in which a recognition process is performed using a third image having a larger data amount than the second image with respect to the extracted second partial image area; and recognize a position of the other mobile object on the basis of positional relationships between the recognized markings and the other mobile object.

\* \* \* \* \*